(12) United States Patent
Yun

(10) Patent No.: US 11,384,580 B2
(45) Date of Patent: Jul. 12, 2022

(54) DUAL LOWER RAIL STRUCTURE FOR OPPOSITE SLIDING DOORS

(71) Applicants: Hyundai Motor Company, Seoul (KR); Kia Motors Corporation, Seoul (KR)

(72) Inventor: Hyung-In Yun, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 294 days.

(21) Appl. No.: 16/788,598

(22) Filed: Feb. 12, 2020

(65) Prior Publication Data

US 2021/0108455 A1 Apr. 15, 2021

(30) Foreign Application Priority Data

Oct. 14, 2019 (KR) .......... 10-2019-0127043

(51) Int. Cl.
*E05D 15/30* (2006.01)
*B60J 5/06* (2006.01)
*E05D 15/06* (2006.01)
*E05D 15/10* (2006.01)
*F16H 19/04* (2006.01)

(52) U.S. Cl.
CPC ............ *E05D 15/30* (2013.01); *B60J 5/06* (2013.01); *E05D 15/0665* (2013.01); *E05D 15/101* (2013.01); *E05D 2015/1026* (2013.01); *E05D 2015/1031* (2013.01); *E05Y 2201/722* (2013.01); *E05Y 2900/531* (2013.01); *F16H 19/04* (2013.01)

(58) Field of Classification Search
CPC ............... E05D 15/101; E05D 2015/1031
See application file for complete search history.

(56) References Cited

U.S. PATENT DOCUMENTS

| 5,140,316 | A  | * | 8/1992  | DeLand  | B60J 5/06 180/271 |
| 7,215,240 | B2 | * | 5/2007  | Uehara  | B60J 5/06 340/425.5 |
| 7,827,735 | B1 | * | 11/2010 | Brown   | B60J 5/107 49/394 |
| 10,059,179 | B1 | * | 8/2018  | Wolf    | B60J 7/04 |
| 10,220,687 | B2 | * | 3/2019  | Tsubaki | B60J 5/06 |
| 2016/0114659 | A1 | * | 4/2016 | Maruyama | E05D 15/0608 49/164 |

(Continued)

FOREIGN PATENT DOCUMENTS

| EP | 3667006 A1 * | 6/2020  | ......... E05D 15/1081 |
| FR | 2881998 A1 * | 8/2006  | ............... B60J 5/06 |
| KR | 101684536 B1 | 12/2016 | |

*Primary Examiner* — Marcus Menezes
(74) *Attorney, Agent, or Firm* — Slater Matsil, LLP

(57) ABSTRACT

A dual lower rail structure for opposite sliding doors is provided. The dual lower rail structure includes a first lower rail mounted in a longitudinal direction at a lower side of a vehicle body, a second lower rail mounted in a longitudinal direction on a vehicle body at one side of the first lower rail, a first lower rail roller unit rollably connected to the first lower rail, a second lower rail roller unit having one end rollably connected to the second lower rail, and the other end connected to a sliding door, and a lower rail swing arm rotatably connected to the first lower rail roller unit and the sliding door.

20 Claims, 10 Drawing Sheets

(56) References Cited

U.S. PATENT DOCUMENTS

| | | | | |
|---|---|---|---|---|
| 2016/0356069 A1* | 12/2016 | Choi | ............... | E05D 15/101 |
| 2017/0275931 A1* | 9/2017 | Iacovoni | ............ | E05B 85/00 |
| 2018/0216386 A1* | 8/2018 | Demir | ............. | B60J 5/06 |
| 2018/0266159 A1* | 9/2018 | Bito | ............... | E05F 15/40 |
| 2019/0232897 A1* | 8/2019 | Tomosada | ........ | B60R 16/0215 |
| 2020/0148043 A1* | 5/2020 | Kiryu | ............. | B60J 5/06 |
| 2020/0149333 A1* | 5/2020 | Stoepker | ........... | E05D 15/30 |

\* cited by examiner

DUAL LOWER RAIL STRUCTURE FOR OPPOSITE SLIDING DOORS

CROSS-REFERENCE TO RELATED APPLICATION

This application claims priority to Korean Patent Application No. 10-2019-0127043, filed in the Korean Intellectual Property Office on Oct. 14, 2019, which application is hereby incorporated herein by reference.

TECHNICAL FIELD

The present invention relates to a dual lower rail structure for opposite sliding doors.

BACKGROUND

In general, a vehicle has an occupant compartment having a predetermined size in which a driver or an accompanied occupant may be seated, and occupant compartment opening/closing doors are installed on a vehicle body to open or close the occupant compartment.

Sliding type occupant compartment opening/closing doors include a front sliding door installed at a front side in a longitudinal direction of a vehicle and a rear sliding door installed at a rear side in the longitudinal direction of the vehicle. The front sliding door and the rear sliding door are typically installed to be moved along rails mounted on a vehicle body or the doors.

However, the sliding type occupant compartment opening/closing door in the related art requires three rails (an upper rail, a center rail, and a lower rail) that support an upper portion, a middle portion, and a lower portion of the door during the process of opening or closing the door, and the sliding type occupant compartment opening/closing door also requires components related to the rails. For this reason, the sliding type occupant compartment opening/closing door in the related art has a problem in that the weight of the vehicle and the number of components are increased and a degree of design freedom of the vehicle deteriorates.

Therefore, there has been developed a two-rail type door system for a vehicle provided with only center and lower rails by which a sliding door is slidably supported. For example, Korean Patent No. 10-1584536 (Sliding Door System for Vehicle) in the related art discloses that a door rail (i.e., a center rail) is mounted on a sliding door, a vehicle body rail (i.e., a lower rail) is mounted on a vehicle body, and the sliding door is opened or closed as a center slider coupled to the door rail and a lower slider coupled to the vehicle body rail are moved.

However, referring to FIGS. 1 and 2, in the sliding structure in the related art, as support points at which the sliding door is supported, two support points including a contact point A between the center rail and a central slider and a contact point B between the lower rail and a lower rail roller are formed in a vertical direction. However, there is a problem in that the sliding door rotates about an imaginary axis X connecting the contact points. In addition, because the support points for the sliding door are formed only on the imaginary axis X, there remains only one contact point A in a load direction (direct of the imaginary axis X) when a load of the sliding door is applied, and as a result, the sliding door cannot be stably supported.

SUMMARY

Embodiments of the present invention relate to a dual lower rail structure for opposite sliding doors. Particular embodiments include a dual lower rail structure for opposite sliding doors, which prevents swaying of sliding doors and stably supports the sliding doors in a vehicle mounted with the sliding door and having only center and lower rails.

Embodiments of the present invention provide a new type of structure capable of preventing swaying of a sliding door when the sliding door is opened or closed in a vehicle mounted with the sliding door and having only center and lower rails.

An exemplary embodiment of the present invention provides a dual lower rail structure for opposite sliding doors, the dual lower rail structure including a first lower rail mounted in a longitudinal direction at a lower side of a vehicle body, a second lower rail mounted in a longitudinal direction on a vehicle body at one side of the first lower rail, a first lower rail roller unit rollably connected to the first lower rail, a second lower rail roller unit having one end rollably connected to the second lower rail, and the other end connected to a sliding door, and a lower rail swing arm rotatably connected to the first lower rail roller unit and the sliding door.

The first lower rail may be rectilinear, and the second lower rail may include a rectilinear portion formed in parallel with the first lower rail, and a curved portion extending from the rectilinear portion and curved in a direction toward the first lower rail.

A floor space may be formed to be recessed inward at a lower side of the vehicle body, the first lower rail may be mounted at one side of the floor space, the second lower rail may be mounted at the other side of the floor space, and the first lower rail and the second lower rail may not protrude to the outside of the vehicle body.

A roller configured to be inserted into the second lower rail may be provided at one end of the second lower rail roller unit.

Two sidewalls of the second lower rail into which the roller is inserted may be formed in a width direction of the vehicle body.

A mounting bracket may be fixedly mounted on the sliding door, and one end of the lower rail swing arm may be rotatably connected to the mounting bracket.

The other end of the second lower rail roller unit may be fixedly connected to the mounting bracket.

The dual lower rail structure for opposite sliding doors according to the exemplary embodiment of the present invention may further include a lifter having one end rotatably connected to the lower rail swing arm, and the other end rotatably connected to the sliding door, the lifter being moved by a rectilinear or rotational motion of the lower rail swing arm.

The lifter may include a cylinder filled with gas, and a rod connected to the cylinder.

According to embodiments of the present invention, the following effects are achieved.

First, there are the three support points at which the sliding door is supported even in the case of the two-rail type sliding door structure having only the center and lower rails, and as a result, the sliding door may be stably supported.

Second, the first lower rail and the second lower rail are mounted in the floor space formed in the vehicle mounted with the sliding door, and the first lower rail and the second lower rail are not exposed to the outside. As a result, the vehicle mounted with the sliding door is excellent in external appearance, and there is no obstruction in a movement route when a user gets in or out of the vehicle.

Third, the two sidewalls of the second roller insertion portion are formed in the width direction (L direction), such that the door is prevented from moving in the L direction.

Fourth, the force is still applied to the lifter in one direction in the fully closed state of the door, the fully opened state of the door, and the door moving state, and as a result, the swaying of the door is prevented.

BRIEF DESCRIPTION OF THE DRAWINGS

For a more complete understanding of the present invention, and the advantages thereof, reference is now made to the following descriptions taken in conjunction with the accompanying drawings.

DETAILED DESCRIPTION OF ILLUSTRATIVE EMBODIMENTS

Hereinafter, exemplary embodiments of a dual lower rail structure for opposite sliding doors according to the present invention will be described in detail with reference to the drawings. Terms or words used herein should not be interpreted as being limited to a general or dictionary meaning and should be interpreted as a meaning and a concept which conform to the technical spirit of the present invention based on a principle that an inventor can appropriately define a concept of a term in order to describe his/her own invention by the best method.

Figure 1:
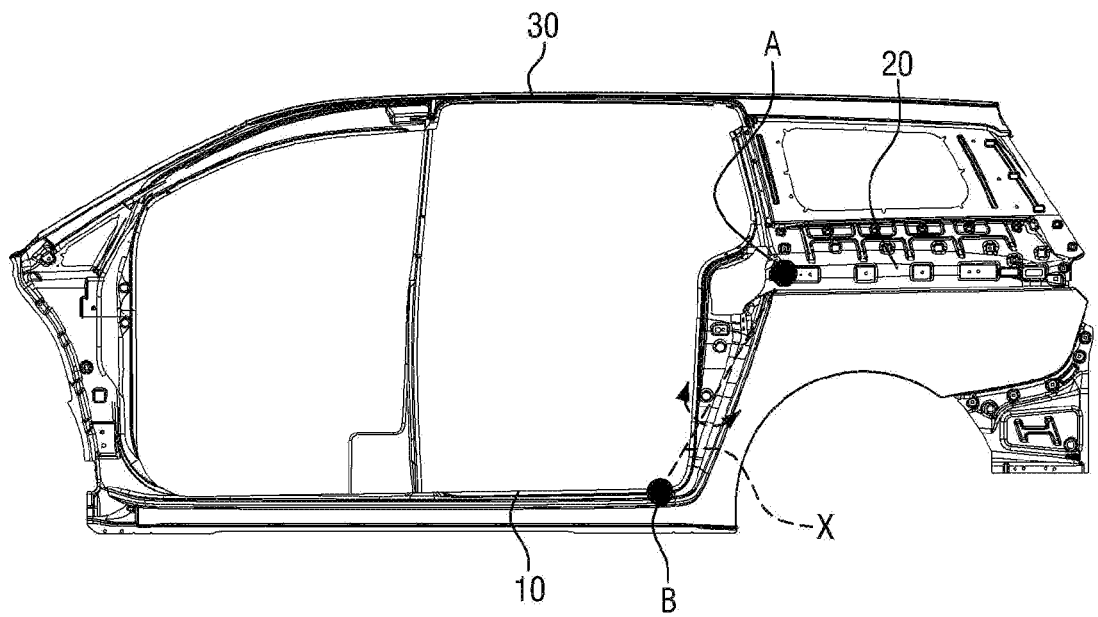
FIG. 1 is a view illustrating support points at which a sliding door for a vehicle having only center and lower rails in the related art is supported.
Figure 2:
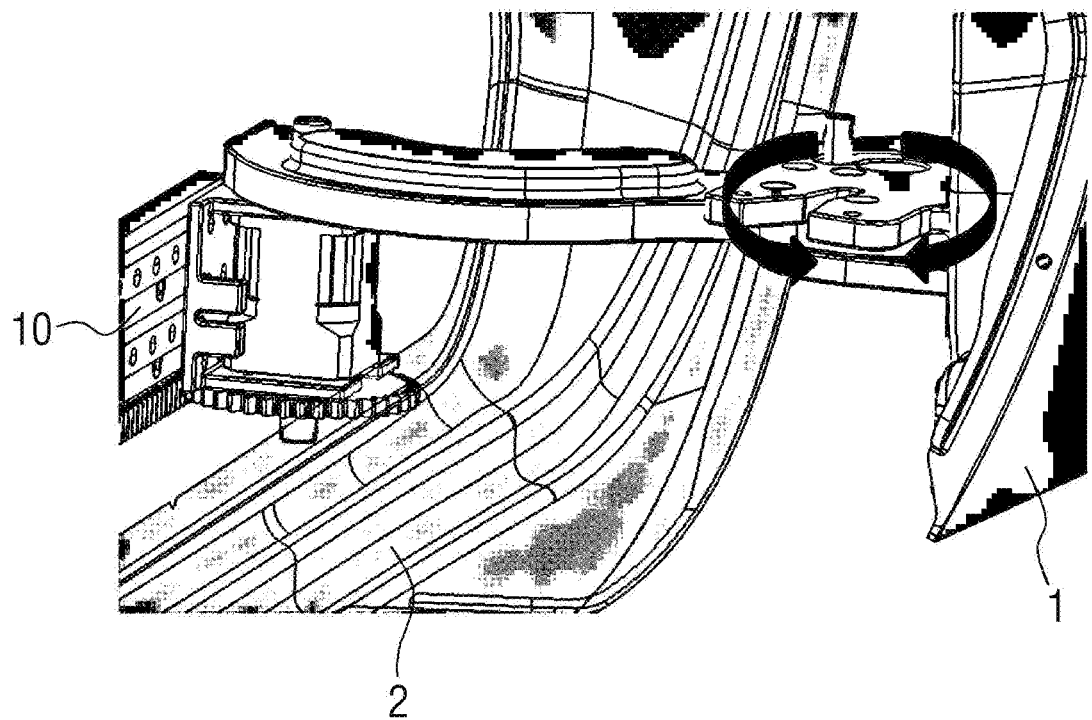
FIG. 2 is a view illustrating a state in which the sliding door illustrated in FIG. 1 is rotatable.
Figure 3:
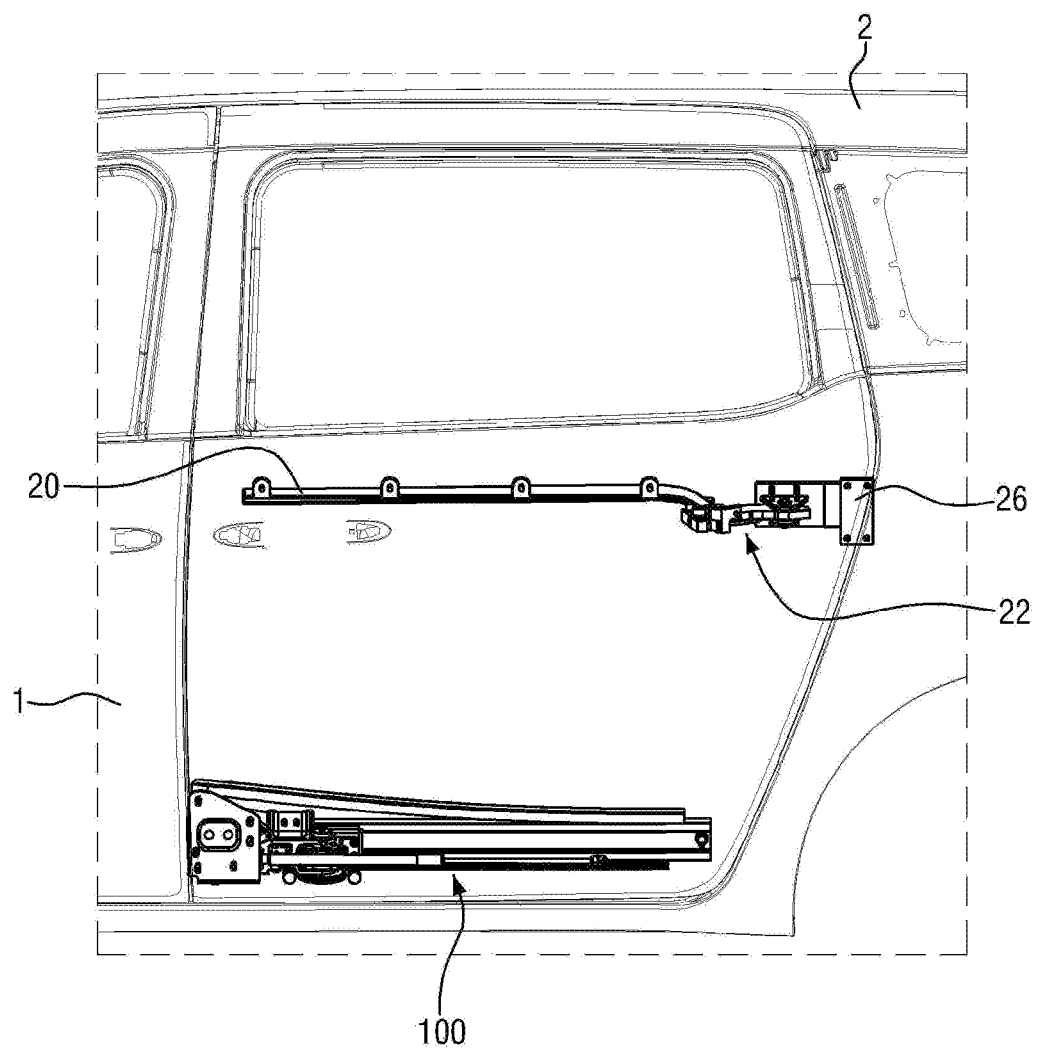
FIG. 3 is a view illustrating a state in which a dual lower rail structure according to an exemplary embodiment of the present invention is applied to a vehicle.
Figure 4:
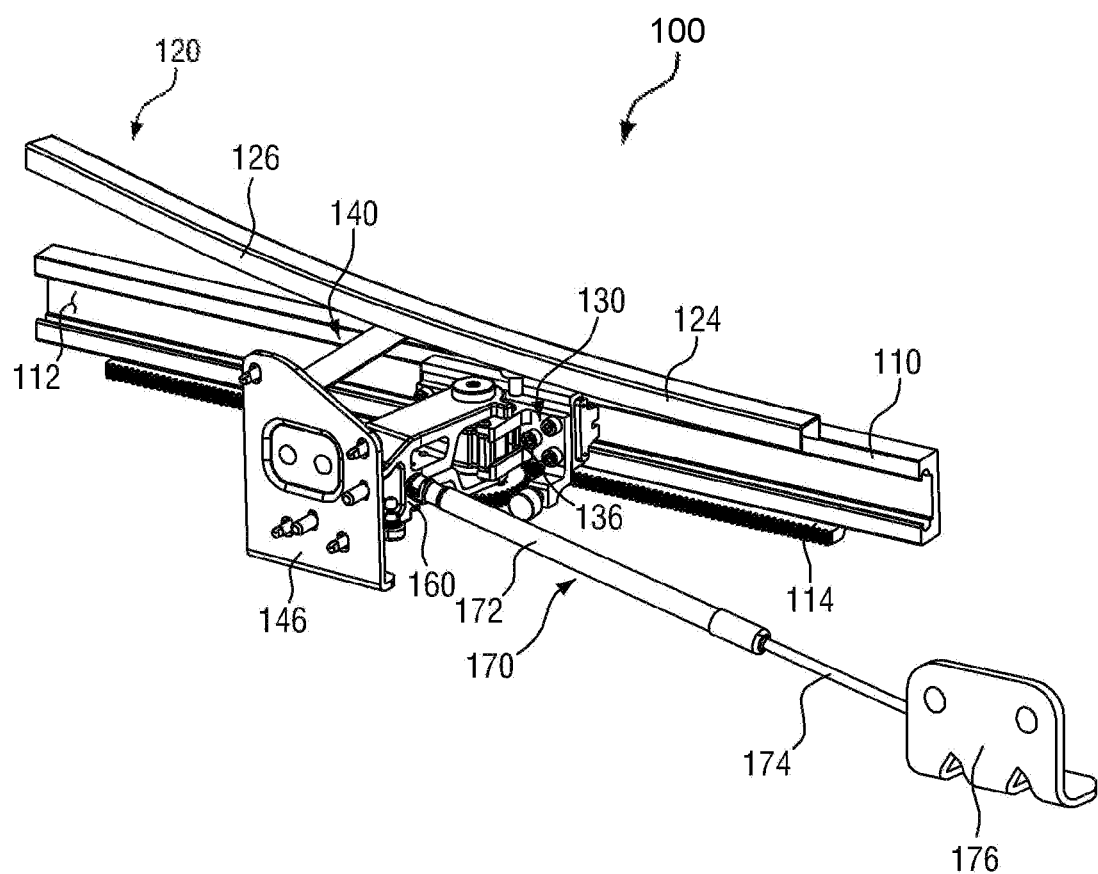
FIG. 4 is a view illustrating an overall configuration of the dual lower rail structure according to an exemplary embodiment of the present invention.
Figure 5:
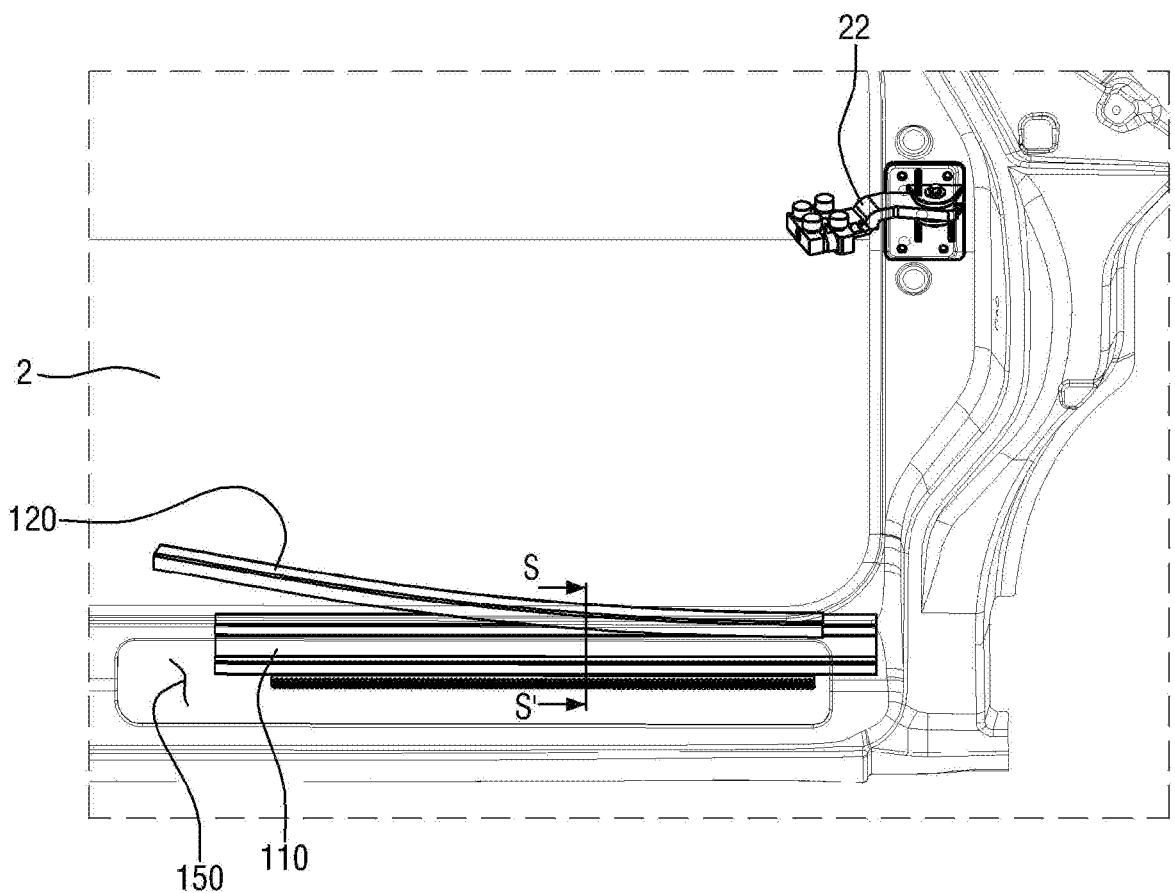
FIG. 5 is a view illustrating a state in which the dual lower rail structure according to an exemplary embodiment of the present invention is connected to a vehicle body.
Figure 6:
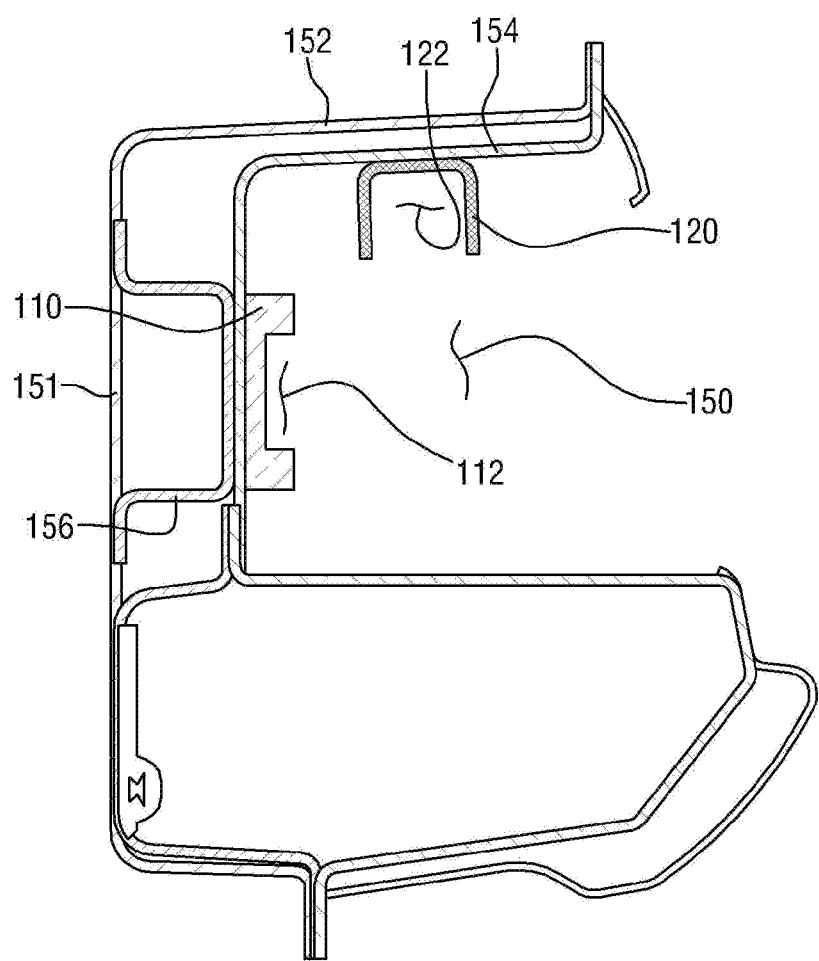
FIG. 6 is a view illustrating a cross section taken along line S-S' in FIG. 5.
Figure 7:
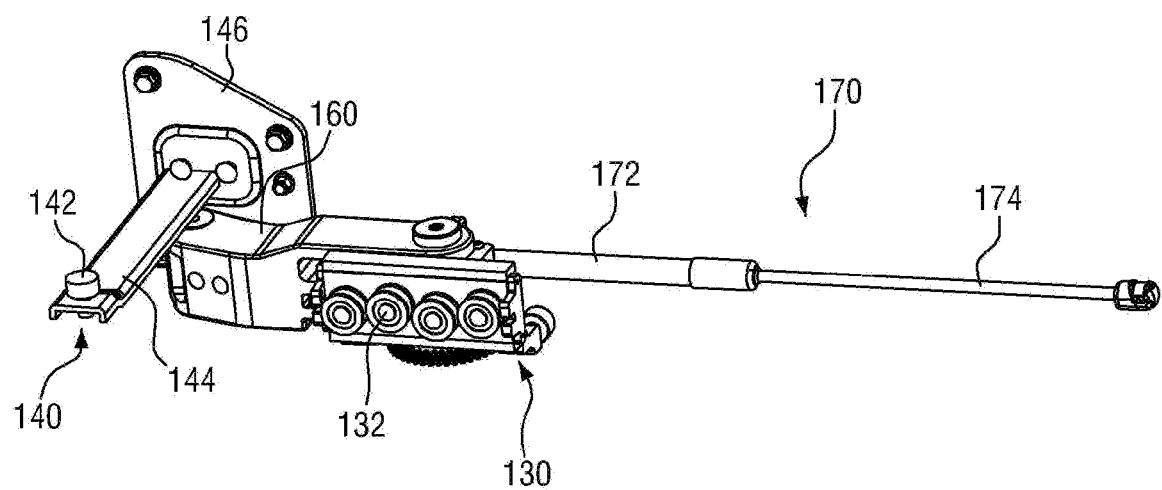
FIG. 7 is a view illustrating a state in which the dual lower rail structure according to an exemplary embodiment of the present invention is connected to a door.

FIG. 3 is a view illustrating a state in which a dual lower rail structure according to an exemplary embodiment of the present invention is applied to a vehicle, FIG. 4 is a view illustrating an overall configuration of the dual lower rail structure according to an exemplary embodiment of the present invention, FIG. 5 is a view illustrating a state in which the dual lower rail structure according to an exemplary embodiment of the present invention is connected to a vehicle body, FIG. 6 is a view illustrating a cross section taken along line S-S' in FIG. 5, and FIG. 7 is a view illustrating a state in which the dual lower rail structure according to an exemplary embodiment of the present invention is connected to a door.

According to an exemplary embodiment of the present invention, in a vehicle, there are a center rail 20 (a rail disposed at a center of the vehicle) and a lower rail 10 (a rail disposed at a lower side of the vehicle), but there is no upper rail 30 (a rail disposed at an upper side of the vehicle). Here, the center rail 20 is provided on a sliding door 1 (hereinafter, referred to as a 'door'), and the lower rail 10 is provided on a vehicle body 2.

The doors 1 include a front door and a rear door. A dual lower rail structure 100 for opposite sliding doors according to the exemplary embodiment of the present invention is applied to the front door or the rear door. The dual lower rail structures 100 for opposite sliding doors, which are applied to the front door and the rear door, respectively, are identical in configuration and operational principle. However, in the present specification, for ease of description, an example in which the dual lower rail structure 100 for opposite sliding doors is applied to any one of the doors 1 will be described.

Referring to FIGS. 3 and 4, the dual lower rail structure 100 for opposite sliding doors according to an exemplary embodiment of the present invention is provided at lower sides of the vehicle body 2 and the door 1. One end of a center rail roller unit 22 is rotatably connected to the vehicle body 2, and the other end of the center rail roller unit 22 is rollably connected to the center rail 20.

The dual lower rail structure 100 for opposite sliding doors according to the exemplary embodiment of the present invention includes a first lower rail 110, a second lower rail 120, a first lower rail roller unit 130, a lower rail swing arm 160, and a second lower rail roller unit 140.

The first lower rail 110 is elongated in a longitudinal direction of the vehicle body 2 and mounted on the vehicle body 2. The first lower rail 110 has an approximately rectilinear shape. A first roller insertion portion 112 is formed at an approximately central portion of the first lower rail 110, and a rack 114 is formed at one side of the first lower rail 110.

The second lower rail 120 is provided at one side of the first lower rail 110 and disposed approximately in parallel with the first lower rail 110. The second lower rail 120 is elongated in the longitudinal direction of the vehicle body 2 and mounted on the vehicle body 2.

The second lower rail 120 according to the exemplary embodiment of the present invention has a second roller insertion portion 122 having a lower opening portion and sidewalls formed at both sides of the lower opening portion. Here, the two sidewalls of the second lower rail 120 are formed in a width direction (L direction) of the vehicle body 2.

The second lower rail 120 includes a rectilinear portion 124 and a curved portion 126. The rectilinear portion 124 is approximately parallel to the first lower rail 110. The curved portion 126 extends from the rectilinear portion 124, and the extending end of the curved portion 126 is curved toward the first lower rail 110.

Referring to FIGS. 5 and 6, the first lower rail 110 and the second lower rail 120 are mounted in a floor space 150 formed at the lower side of the vehicle body 2.

The floor space 150 is shaped to be recessed toward the inside of the vehicle body 2 through an opening portion. A first sidewall 151 is provided in a height direction (H direction) of the vehicle body 2 at one side of the floor space 150, and a second sidewall 152 is provided in the width direction (L direction) of the vehicle body 2 at the other side of the floor space 150. A rail fastening unit 154 is formed in the floor space 150 and spaced apart from the first sidewall 151 and the second sidewall 152 at a predetermined distance, and a spacing portion 156 is formed in a space between the rail fastening unit 154, the first sidewall 151, and the second sidewall 152 which are spaced apart from one another. Therefore, the rail fastening unit 154 may be supported by the spacing portion 156 and spaced apart from the first sidewall 151 and the second sidewall 152 at a predetermined distance.

The first lower rail 110 is mounted on a portion of the rail fastening unit 154 which is formed toward the first sidewall 151, and the second lower rail 120 is mounted on a portion of the rail fastening unit 154 which is formed toward the second sidewall 152. When the first lower rail 110 is mounted on the rail fastening unit 154, the first roller insertion portion 112 is directed toward the opening portion of the floor space 150. In addition, when the second lower rail 120 is mounted on the rail fastening unit 154, the second roller insertion portion 122 is directed toward a lower side of the floor space 150.

The floor space 150 is a space formed in advance when designing the vehicle mounted with the sliding door, and the first lower rail 110 and the second lower rail 120 are not exposed to the outside of the floor space 150 (the outside of the opening portion of the floor space). Therefore, according to an exemplary embodiment of the present invention, the vehicle mounted with the sliding door is excellent in external appearance, there is no obstruction in a movement route when a user gets in or out of the vehicle, and the floor space 150 formed in the related art may be used to mount the first lower rail 110 and the second lower rail 120 without changing the design of the vehicle body 2.

Referring to FIG. 7, the first lower rail roller unit 130 is rollably connected to the first lower rail 110. Specifically, a first roller 132 of the first lower rail roller unit 130 is inserted into the first roller insertion portion 112 of the first lower rail 110. The first roller 132 may rotate in a state of being in contact with the sidewalls of the first roller insertion portion 112. Therefore, the first lower rail roller unit 130 may move in the longitudinal direction of the vehicle body 2 while being guided by the first lower rail 110.

The lower rail swing arm 160 connects the door 1 and the first lower rail roller unit 130. Specifically, one end of the lower rail swing arm 160 is rotatably connected to the first lower rail roller unit 130, and the other end of the lower rail swing arm 160 is rotatably connected to a first mounting bracket 146 fixedly mounted inside the door 1. Therefore, when the door 1 moves, the lower rail swing arm 160 may rotate about the first lower rail roller unit 130 and may rectilinearly move along the first lower rail 110.

A speed reducer 136 for controlling the rotation is provided at a point at which the lower rail swing arm 160 is rotatably connected to the first lower rail roller unit 130. Further, at one side of the lower rail swing arm 160, a pinion 134 is provided in a direction toward the first lower rail 110. Therefore, the pinion 134 and the rack 114 may mesh with each other.

A lifter 170 is connected to the lower rail swing arm 160 according to an exemplary embodiment of the present invention. The lifter 170 includes a cylinder 172 filled with gas, and a rod 174 connected to the cylinder 172.

One end of the rod 174 is connected to the interior of the cylinder 172, and the other end of the rod 174 is rotatably connected to a lifter bracket 176 fixedly mounted inside the door 1 and disposed at a position spaced apart from the first mounting bracket 146 at a predetermined distance. Therefore, when the lower rail swing arm 160 rotates, the rod 174 moves in the cylinder 172, such that a length of the lifter 170 is changed.

The second lower rail roller unit 140 includes a second roller support unit 144. One end of the second roller support unit 144 is fixedly mounted on the first mounting bracket 146, and a second roller 142 is rotatably connected to the other end of the second roller support unit 144. Here, the second roller 142 is inserted into the second roller insertion portion 122 of the second lower rail 120. Therefore, the second roller 142 may rotate in a state of being in contact with the two sidewalls of the second roller insertion portion 122.

The second roller support unit 144 according to the exemplary embodiment of the present invention has a rectilinear shape having a predetermined length. However, the second roller support unit 144 may have various shapes.

Figure 8:
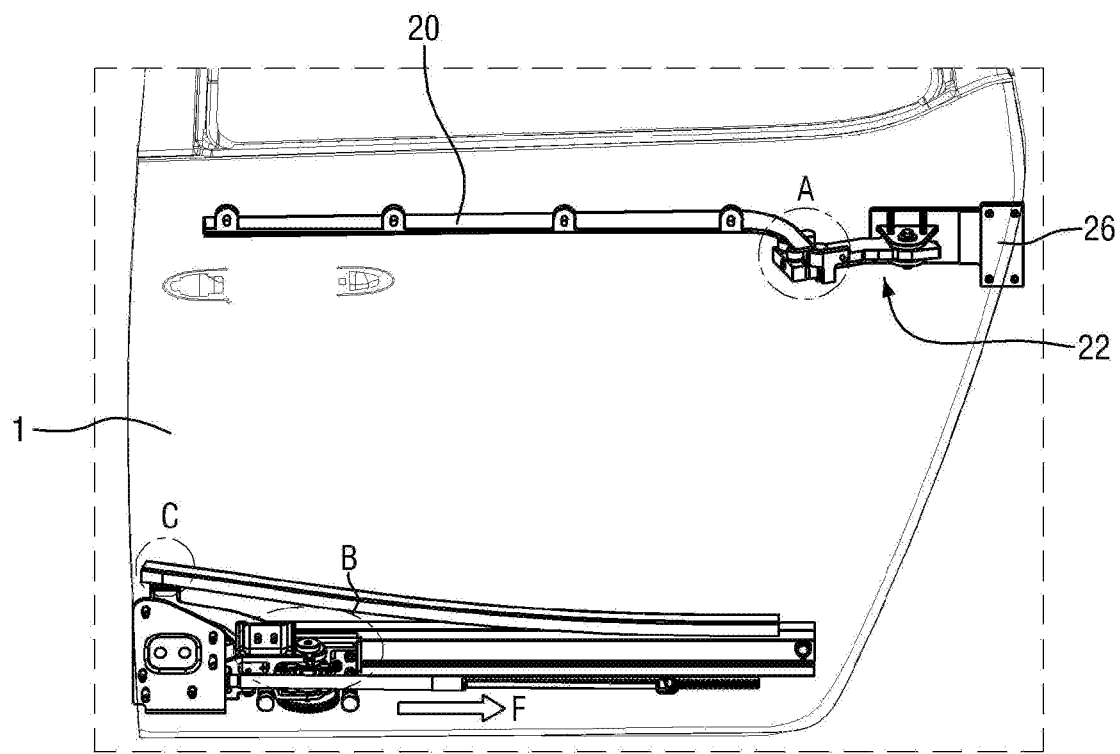
FIG. 8 is a view illustrating three support points at which the sliding door is supported by the dual lower rail structure according to an exemplary embodiment of the present invention in a state in which the sliding door is closed.
Figure 9:
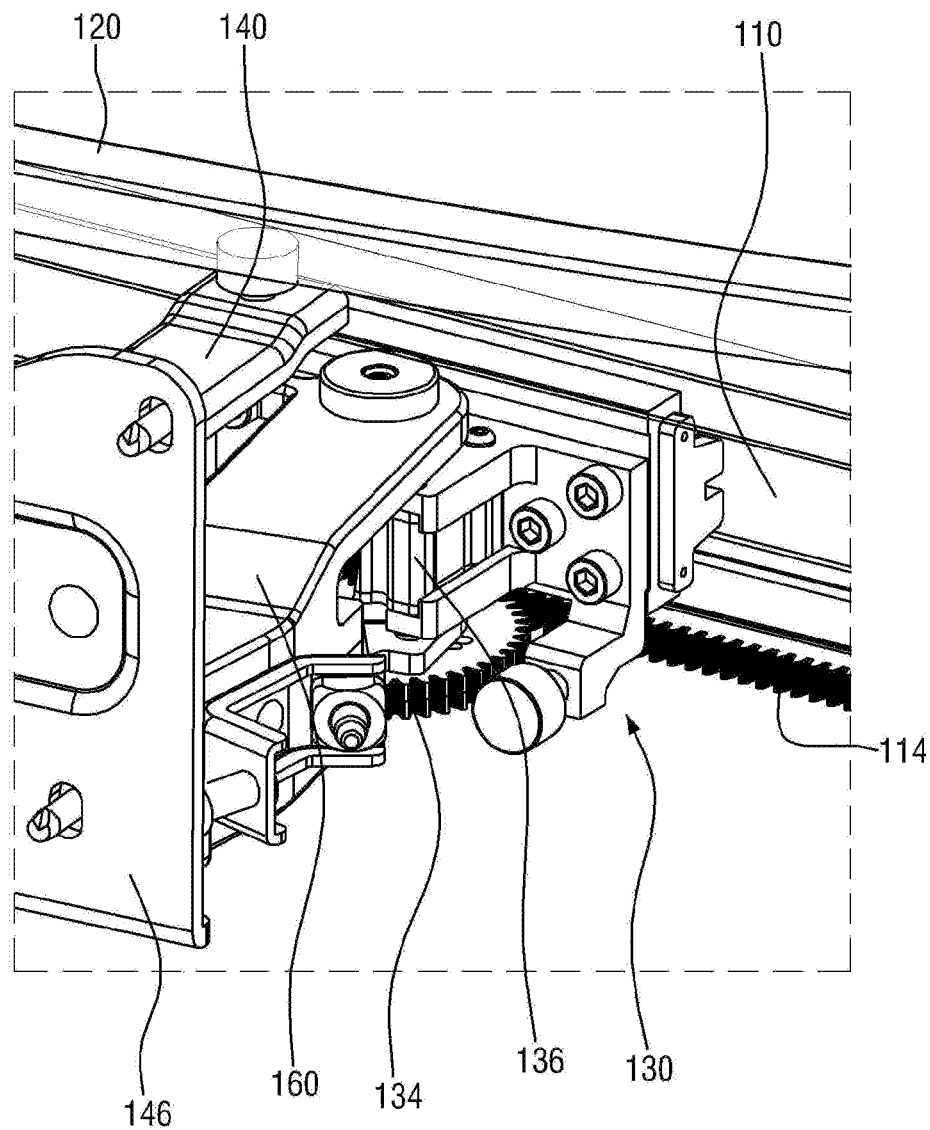
FIG. 9 is a view illustrating a state in which a lower rail swing arm according to an exemplary embodiment of the present invention is rotated.
Figure 10:
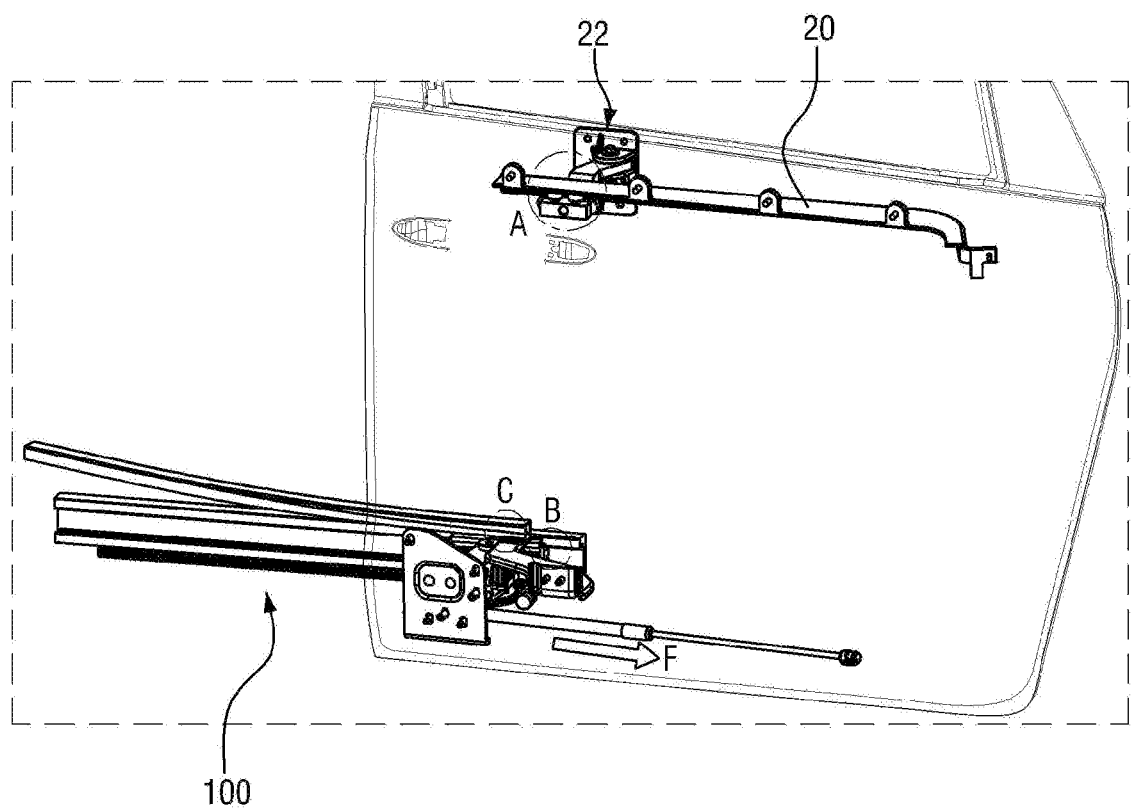
FIG. 10 is a view illustrating three support points at which the sliding door is supported by the dual lower rail structure according to an exemplary embodiment of the present invention in a state in which the sliding door is opened.

FIG. 8 is a view illustrating three support points at which the sliding door is supported by the dual lower rail structure according to an exemplary embodiment of the present invention in a state in which the sliding door is closed, FIG. 9 is a view illustrating a state in which the lower rail swing arm according to an exemplary embodiment of the present invention is rotated, and FIG. 10 is a view illustrating three support points at which the sliding door is supported by the dual lower rail structure according to an exemplary embodiment of the present invention in a state in which the sliding door is opened.

Hereinafter, an operating process and an effect of the dual lower rail structure for opposite sliding doors according to an exemplary embodiment of the present invention will be described with reference to FIGS. 8 to 10.

First, a state of the dual lower rail structure according to the exemplary embodiment of the present invention in a state in which the door 1 is closed as illustrated in FIG. 8 will be described.

The first lower rail roller unit 130 is connected to the first lower rail 110 and positioned at one side (left side in FIG. 8), and the lower rail swing arm 160 connected to the first lower rail roller unit 130 is fully rotated in one direction (hereinafter, referred to as a 'folded state'). At the same time, the second lower rail roller unit 140 is connected to the second lower rail 120 and positioned at one side (left side in FIG. 8). In this case, the second lower rail roller unit 140 is positioned on the curved portion 126 of the second lower rail 120.

The door 1 and the vehicle body 2 are closest in distance to each other when the door 1 is closed. Since the second roller support unit 144 has a predetermined length as described above, the other end of the second roller support unit 144 needs to be positioned on the curved portion 126 so that the door 1 and the vehicle body 2 become closer to each other.

As described above, in an exemplary embodiment of the present invention, the center rail 20 is provided on the door 1, and the center rail roller unit 22 is rollably connected to the center rail 20. The center rail roller unit 22 is rotatably connected to a second mounting bracket 26 fixedly connected to the vehicle body 2.

There are three support points at which the door 1 is supported in the state in which the door 1 is closed, and the three support points include a contact point A between the center rail 20 and the center rail roller unit 22, a contact point B between the first lower rail 110 and the first lower rail roller unit 130, and a contact point C between the second lower rail 120 and the second lower rail roller unit 140. The three support points A, B, and C define an approximately triangular shape. Therefore, the door 1 is stably supported, and swaying of the door 1 is prevented.

Since the two sidewalls of the second roller insertion portion 122 are formed in the width direction (L direction) of the vehicle body 2, the door 1 is prevented from moving in the L direction in the state in which the second roller 142 is inserted into the second roller insertion portion 122.

In the state in which the door 1 is closed, the lifter 170 is almost folded together with the lower rail swing arm 160. Here, force F is applied to the lifter 170 in a direction toward one side (right side in FIG. 8). Therefore, the lifter 170 assists in preventing the door 1 from swaying.

When external force with a predetermined magnitude is applied in a direction in which the door 1 is opened in the state illustrated in FIG. 8, the door 1 is opened. In this case, as illustrated in FIG. 9, when the pinion 134, which meshes with the rack 114, is rotated, the lower rail swing arm 160 is fully rotated in the other direction through the speed reducer 136 (hereinafter, referred to as an 'unfolded state').

In this case, the distance between the door 1 and the vehicle body 2 is gradually increased and then becomes longest in the state in which the lower rail swing arm 160 is unfolded. Since the second roller support unit 144 has a predetermined length as described above, the second lower rail roller unit 140 needs to move along the curved portion 126 to one side (right side in FIG. 9) so that the distance between the door 1 and the vehicle body 2 is gradually increased. The other end of the second roller support unit 144 needs to be positioned on the rectilinear portion 124 so that the door 1 and the vehicle body 2 are most distant from each other.

Next, a state of the dual lower rail structure according to an exemplary embodiment of the present invention in a state in which the door 1 is opened as illustrated in FIG. 10 will be described.

As illustrated in FIG. 10, in the state in which the door 1 is opened, the first lower rail roller unit 130 is positioned at the other side (right side in FIG. 10) of the first lower rail 110, the lower rail swing arm 160 is in an unfolded state, and the second lower rail roller unit 140 is positioned at the other side (right side in FIG. 10). In this case, the second lower rail roller unit 140 is positioned on the rectilinear portion 124 of the second lower rail 120.

Like the closed state of the door 1, there are three support points A, B, and C at which the door 1 is supported in the state in which the door 1 is opened, and the three support points A, B, and C define an approximately triangular shape. Therefore, the door 1 is stably supported, and swaying of the door 1 is prevented. However, the opened state of the door 1 differs from the closed state of the door 1 in that the distance between the contact point C and the contact point B is short. That is because the lower rail swing arm 160 is rotated in the unfolded state. Since the contact point B and the contact point C are spaced apart from each other in the vertical direction even in this case, the support points A, B, and C still maintain the triangular shape.

Since the second roller 142 remains inserted into the second roller insertion portion 122 even in the case in which the door 1 is opened, the door 1 is prevented from moving in the L direction.

When the lifter 170 moves by the rotation of the lower rail swing arm 160 and the door 1 is opened, the lifter 170 is inclined together with the lower rail swing arm 160. Here, the force F is still applied to the lifter 170 in the direction toward one side (right side in FIG. 10). Therefore, the lifter 170 assists in preventing the door 1 from swaying.

The present invention has been described with reference to the exemplary embodiments and the drawings, but the present invention is not limited thereto. The described exemplary embodiments may be variously changed or modified by those skilled in the art to which the present invention pertains within the technical spirit of the present invention and within the scope equivalent to the appended claims.

What is claimed is:

1. A dual lower rail structure for opposite sliding doors, the dual lower rail structure comprising:
    a first lower rail mounted in a longitudinal direction at a lower side of a vehicle body;
    a second lower rail mounted in the longitudinal direction on the vehicle body at one side of the first lower rail;
    a first lower rail roller unit rollably connected to the first lower rail;
    a second lower rail roller unit having a first end rollably connected to the second lower rail and a second end connected to a sliding door;
    a lower rail swing arm rotatably connected to the first lower rail roller unit and the sliding door; and
    a lifter having a first end rotatably connected to the lower rail swing arm and a second end rotatably connected to the sliding door, the lifter being configured to move by a rectilinear or rotational motion of the lower rail swing arm.

2. The dual lower rail structure of claim 1, wherein the first lower rail is rectilinear.

3. The dual lower rail structure of claim 1, wherein the second lower rail comprises a rectilinear portion formed in parallel with the first lower rail, and a curved portion extending from the rectilinear portion and curved in a direction toward the first lower rail.

4. The dual lower rail structure of claim 1, wherein the first lower rail is mounted at a first side of a floor space that is recessed inward at the lower side of the vehicle body, the second lower rail is mounted at a second side of the floor space, and the first lower rail and the second lower rail do not protrude outside of the vehicle body.

5. The dual lower rail structure of claim 1, wherein a roller is provided at one end of the second lower rail roller unit, and wherein the roller is configured to be inserted into the second lower rail.

6. The dual lower rail structure of claim 1, wherein the second lower rail comprises two sidewalls formed in a width direction of the vehicle body.

7. The dual lower rail structure of claim 1, wherein a mounting bracket is fixedly mounted on the sliding door, and one end of the lower rail swing arm is rotatably connected to the mounting bracket.

8. The dual lower rail structure of claim 7, wherein the second end of the second lower rail roller unit is fixedly connected to the mounting bracket.

9. The dual lower rail structure of claim 1, wherein the lifter comprises a cylinder filled with gas, and a rod connected to the cylinder.

10. A vehicle structure comprising:
    the dual lower rail structure of claim 1;
    a center rail mounted at a center of the sliding door; and
    a center rail roller unit connected to the center rail and the vehicle body,
    wherein the sliding door is configured to be supported at three contact points, and wherein the three contact points comprise a first contact point between the center rail and the center rail roller unit, a second contact point between the first lower rail and the first lower rail roller unit, and a third contact point between the second lower rail and the second lower rail roller unit, and the sliding door is supported at the three contact points.

11. A vehicle comprising:
a vehicle body;
a sliding door;
a dual lower rail structure for the sliding door, the dual lower rail structure comprising:
  a first lower rail mounted in a longitudinal direction at a lower side of the vehicle body;
  a second lower rail mounted in the longitudinal direction on the vehicle body at a first side of the first lower rail;
  a first lower rail roller unit rollably connected to the first lower rail;
  a second lower rail roller unit having a first end rollably connected to the second lower rail, and a second end connected to the sliding door; and
  a lower rail swing arm rotatably connected to the first lower rail roller unit and the sliding door; and
a center rail mounted at a center of the sliding door;
a center rail roller unit connected to the center rail and the vehicle body; and
a lifter having a first end rotatably connected to the lower rail swing arm and a second end rotatably connected to the sliding door, wherein the lifter comprises a cylinder filled with gas and a rod connected to the cylinder.

12. The vehicle of claim 11, further comprising three contact points configured to support the sliding door.

13. The vehicle of claim 12, wherein the three contact points comprise:
  a first contact point between the center rail and the center rail roller unit;
  a second contact point between the first lower rail and the first lower rail roller unit; and
  a third contact point between the second lower rail and the second lower rail roller unit.

14. The vehicle of claim 11, further comprising a mounting bracket fixedly mounted on the sliding door, wherein one end of the lower rail swing arm is rotatably connected to the mounting bracket.

15. The vehicle of claim 14, wherein the second end of the second lower rail roller unit is fixedly connected to the mounting bracket.

16. A dual lower rail structure for opposite sliding doors, the dual lower rail structure comprising:
  a first lower rail mounted in a longitudinal direction at a lower side of a vehicle body, wherein the first lower rail is rectilinear;
  a second lower rail mounted in the longitudinal direction on the vehicle body at one side of the first lower rail, wherein the second lower rail comprises a rectilinear portion formed in parallel with the first lower rail, and a curved portion extending from the rectilinear portion and curved in a direction toward the first lower rail;
  a first lower rail roller unit rollably connected to the first lower rail;
  a second lower rail roller unit having a first end rollably connected to the second lower rail and a second end connected to a sliding door;
  a lower rail swing arm rotatably connected to the first lower rail roller unit and the sliding door; and
  a lifter having a first end rotatably connected to the lower rail swing arm and a second end rotatably connected to the sliding door, the lifter being configured to move by a rectilinear or rotational motion of the lower rail swing arm.

17. The dual lower rail structure of claim 16, wherein the first lower rail is mounted at a first side of a floor space that is recessed inward at the lower side of the vehicle body, the second lower rail is mounted at a second side of the floor space, and the first lower rail and the second lower rail do not protrude outside of the vehicle body.

18. The dual lower rail structure of claim 16, wherein a roller is provided at one end of the second lower rail roller unit, and wherein the roller is configured to be inserted into the second lower rail.

19. The dual lower rail structure of claim 16, wherein a mounting bracket is fixedly mounted on the sliding door, and one end of the lower rail swing arm is rotatably connected to the mounting bracket.

20. The dual lower rail structure of claim 16, wherein the lifter comprises a cylinder filled with gas, and a rod connected to the cylinder.

* * * * *